United States Patent [19]

Sexstone et al.

[11] 4,354,591

[45] Oct. 19, 1982

[54] CARTON COLLATING AND TRANSFER APPARATUS

[75] Inventors: John H. Sexstone, Anchorage; Tom Lewis, Louisville; Ken Milliner, Louisville; Everett N. Finn, Louisville, all of Ky.

[73] Assignee: Brown & Williamson Tobacco Corporation, Louisville, Ky.

[21] Appl. No.: 208,354

[22] Filed: Nov. 19, 1980

[51] Int. Cl.³ .............................................. B65G 47/68
[52] U.S. Cl. .................................... 198/451; 198/492
[58] Field of Search ............... 198/451, 448, 447, 461, 198/492; 193/40, 32, 35 G

[56] References Cited

U.S. PATENT DOCUMENTS 1,980,411  11/1934  Kimball ............................... 198/451
2,840,223   6/1958  Schoppee ....................... 198/492 X
3,823,813   7/1974  Holt ................................ 198/461 X Primary Examiner—John J. Love
Assistant Examiner—Douglas D. Watts
Attorney, Agent, or Firm—Charles G. Lamb

[57] ABSTRACT

An apparatus for collating cartons received from a plurality of sources in a tightly packed together relationship or randomly spaced apart relationship, and transferring these cartons in a substantially uniformly spaced apart relationship into a single stream of cartons for transport to another location.

11 Claims, 6 Drawing Figures

CARTON COLLATING AND TRANSFER APPARATUS

BACKGROUND OF THE INVENTION

The invention relates to a system for conveying a group of items from one place to another, and more particularly to a conveyor system for moving a group of items by associating the items from a plurality of sources into a uniformly distributed group.

A problem faced in many manufacturing operations is that a first step cannot be performed as rapidly as a second step. This leads to inefficient use of the equipment and manpower associated with the first step.

In packaging operations, this is often the case. It occurs that the packaging of individual items into a container can be done faster than the speed at which the individual items can be prepared.

To solve this problem, a plurality of item preparing operations are used to supply items to a packaging station. However, another problem occurs quite often in that the items should be supplied to the packaging station in an orderly array but the items are not supplied from the item preparing operations in such an array because, for example, the item preparing operations are operating individually and not necessarily in concert with one another.

A further problem which sometimes happens is because of, for example, space limitations, the flow path of items coming from item preparing operations must be changed to transport the items to the packaging operation.

Each problem discussed above can individually be present in a manufacturing operation as well as occur in combination.

SUMMARY OF THE INVENTION

The present invention recognizes and provides a solution to these problems which is straightforward and relatively inexpensive to make and maintain in operation.

More particularly, the present invention provides a carton collating and transfer apparatus for distributing cartons received from a plurality of feeder conveyer devices onto a single take-away conveyer device traveling at an angle to the feeder conveyer devices, comprising a plurality of endless conveyer belt means defining plural paths equal in number to the number of feeder conveyer belt means, each path being associated with a different one of the feeder conveyer devices to receive cartons therefrom. A first carton stop station is associated with each one of the plural paths of the endless conveyer belt means. Each first carton stop means is movable between a carton release position and a carton stop position for selectively stopping at least one carton on said endless conveyer belt means. A second carton stop station is associated with each one of the plural paths of the endless conveyer belt means downstream of the first carton stop station. The second carton stop station is movable between a carton release position and a carton stop position for selectively stopping a carton on said endless conveyer belt means received from the first stop station. The second stop station is moved in sequence with the first stop station to the carton release position when the first stop station is moved to the carton stop position and to a carton stop position when the first stop station is moved to the carton release position. A carton accelerator means is located proximate each of the second carton stop station to impart linear acceleration to a carton at the second stop station when the second stop station is in the carton release position to move the carton rapidly away from the second stop station and onto the take-away conveyer device disposed downstream of the second stop station.

DESCRIPTION OF THE DRAWINGS

For a more complete understanding of the invention, reference is made to the following specifications and accompanying drawings illustrating a preferred embodiment thereof and in which like numerals refer to like parts throughout the several views and in which.

DETAILED DESCRIPTION OF THE PREFERRED EMBODIMENT

Figure 1:
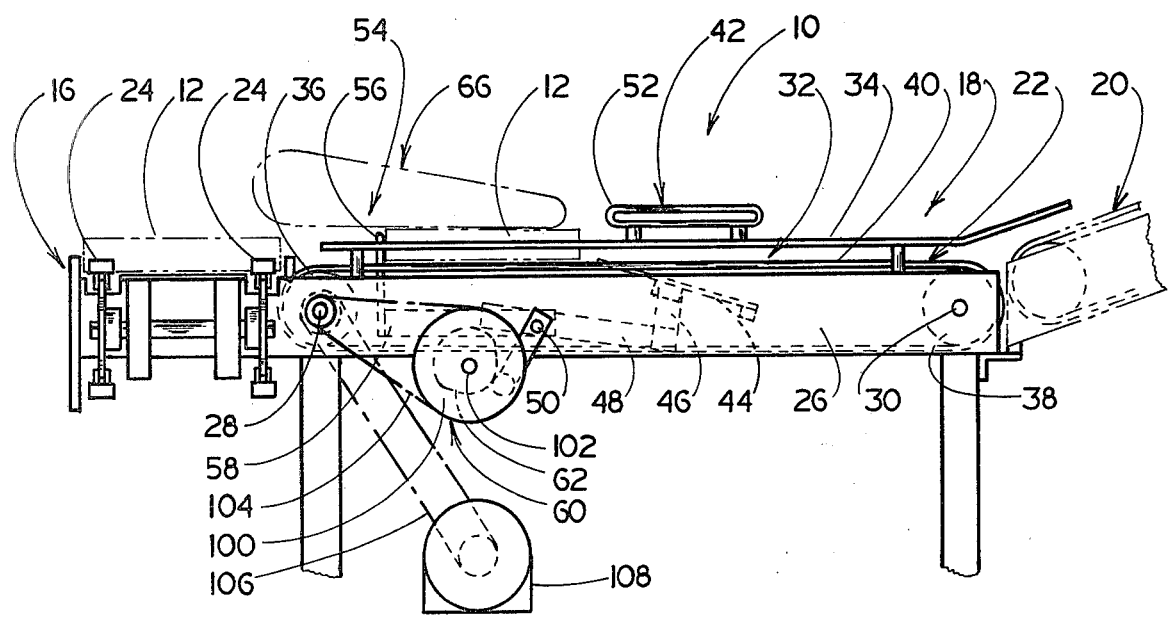
FIG. 1 is a side view of a portion of the apparatus.

FIGS. 1, 2, 3 and 4 illustrate a carton collating and transfer apparatus 10 for distributing and transferring a plurality of cartons 12 received from a plurality of sources, illustrated as four continuously moving feeder conveyer devices 14 onto a single take-away conveyer device 16 at an angle to the feeder conveyer devices.

As illustrated in FIGS. 1 through 4, endless conveyer belt means 18 is associated at one end with the feeder conveyer devices 14 and at the other end with the take-away conveyer device 16. The endless conveyer belt means 18 is illustrated as being formed of a first conveyer belt section 20 and an in-line second conveyer belt section 22. The first conveyer belt section 20 is illustrated as being associated at one of its ends with the feeder conveyer devices 14 and at its opposite end with an end of the second conveyer belt section 22. This configuration allows the first conveyer belt section 20 to move at a different linear speed than the second conveyer belt section 22. Also, this configuration is well suited for those situations where the feeder conveyer devices 14 are at a different elevation than the take-away conveyer belt device 16. However, it is contemplated that the endless conveyer belt means 18 can be continuous along its length where the situation permits. The take-away conveyer device 16 is illustrated as an endless double chain type conveyer with carton engaging lugs 24 attached in pairs to the chains at spaced intervals along the length of the take-away conveyer device 18.

Figure 3:
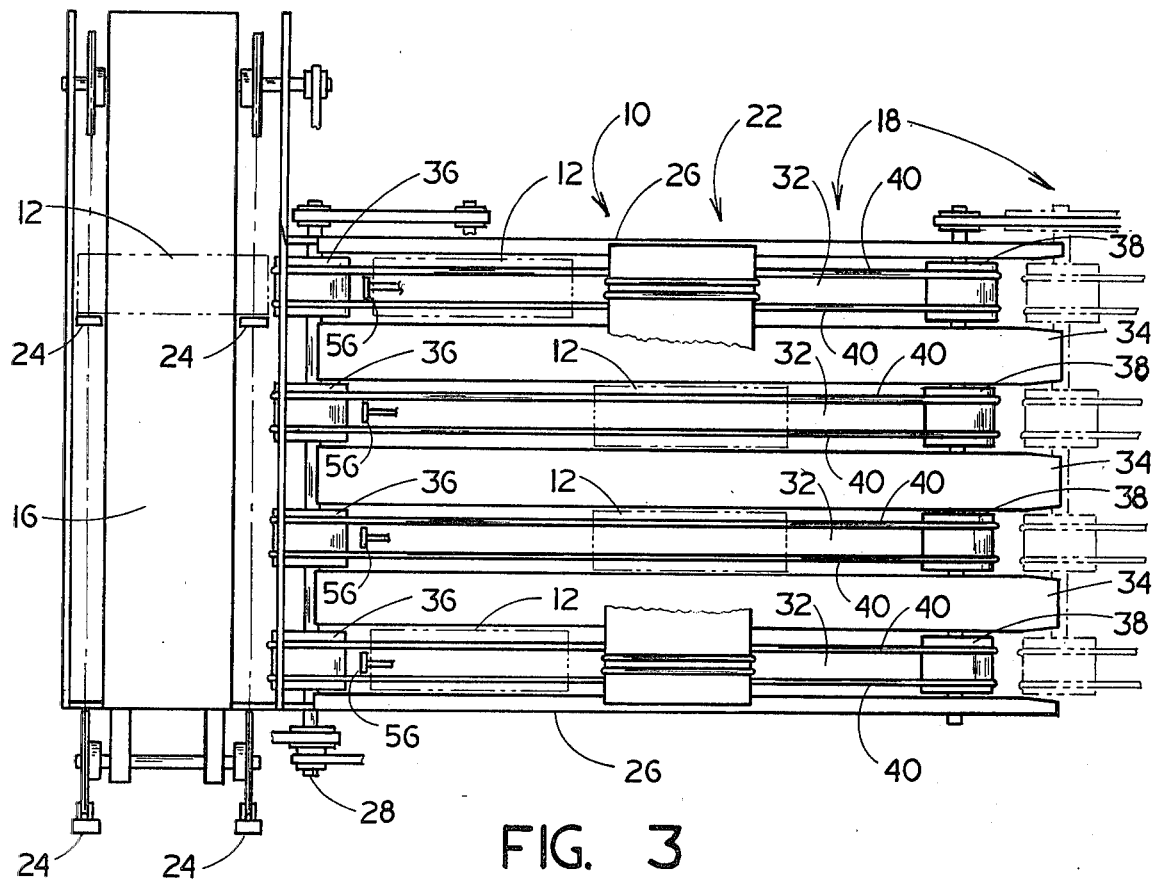
FIG. 3 is a top view of FIG. 1 with components removed for clarity.
Figure 4:
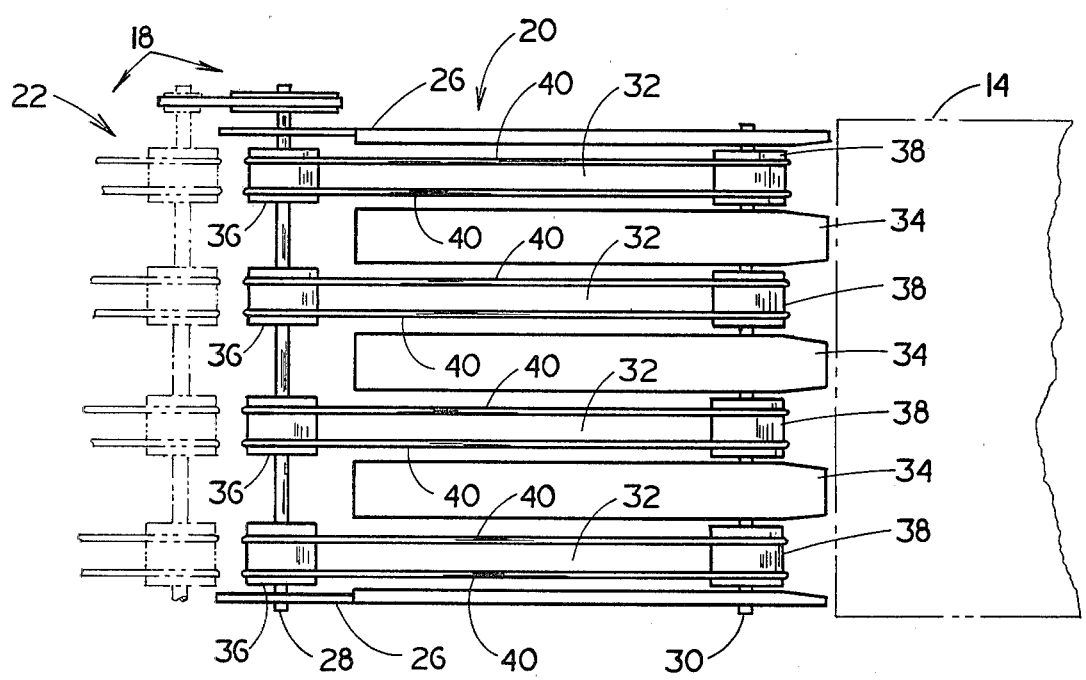
FIG. 4 is a top view of FIG. 2 with components removed for clarity.

As previously mentioned, the endless conveyer belt means 18 is illustrated as comprising a first conveyer belt section 20, illustrated in FIG. 4, and a second conveyer belt section 22, illustrated in FIG. 3. The first and second conveyer belt sections are substantially identical in construction and, therefore, the same reference numerals and descriptions apply equally to each section. The first and second conveyer belt sections each comprise parallel side frame structures 26, a head shaft 28 and a tail shaft 30. The first and second conveyer belt sections are each divided into four lanes 32 by means of three mutually parallel spaced apart elongated lane divider members 34. These lane divider members 34 extend longitudinally of the conveyer belt sections and are spaced equally from each other. The two outermost lane divider members 34 are spaced from their adjacent conveyer side frame structure 26 by the same distance by which adjacently disposed lane divider members 34 are spaced from each other. Each lane is slightly wider than the width of a carton. The head shaft 28 carries four head pulleys 36 which are spaced apart along the head shaft 28 so that each head pulley 36 is in alignment with a different one of the four lanes 32 at one end thereof. The head pulleys 36 are attached to the head shaft 28 for rotation therewith. The tail shaft 30 carries four tail pulleys 38 which are spaced apart along the tail shaft 30 so that each tail pulley is in alignment with a different one of the four lanes 32 at the opposite end thereof from the head pulleys 36. The tail pulleys 38 are attached to the tail shaft 30 for rotation therewith. Each lane 32 also has two spaced apart parallel endless conveyer straps 40 trained about the head pulley 36 and tail pulley 38. The cartons move with the conveyer straps 40 in each lane, therefore, the distance between the conveyer straps 40 in each lane is less than the width dimensions of the cartons. Each lane 32 is associated with a different one of the feeder conveyer devices 14 to receive cartons 12 therefrom.

Figure 5:
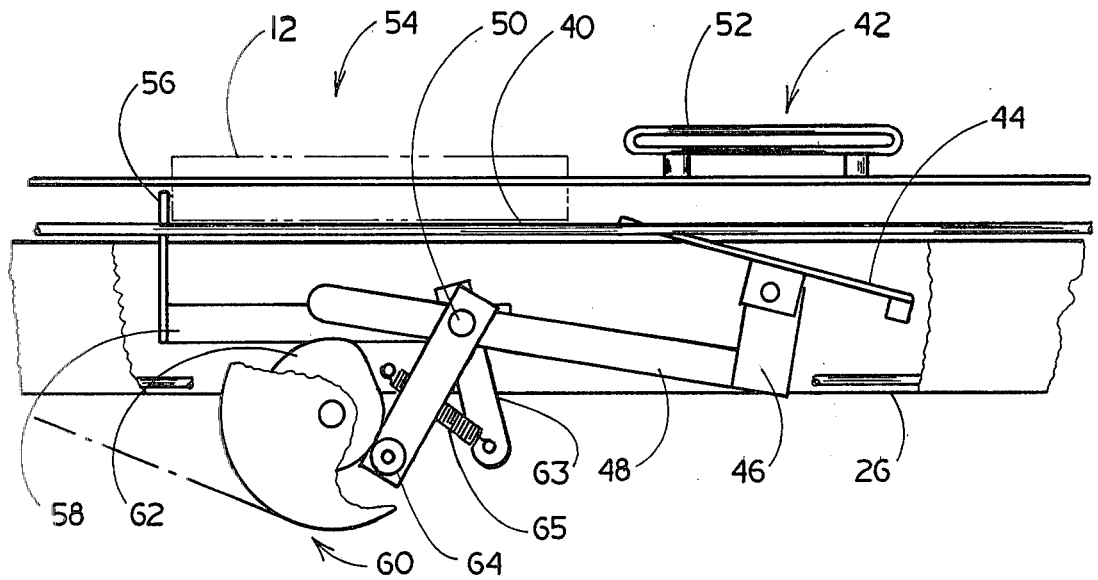
FIG. 5 is an enlarged view of a portion of FIG. 1.

Now with reference to FIG. 1, a first carton stop station, generally denoted by the numeral 42, is operatively associated with each one of the lanes 32 of the endless conveyer belt means 18 to selectively release and stop a carton 12 moving on the endless conveyer straps 40 in each lane 32. As can be seen in FIGS. 1 and 5, the first stop station 42 is illustrated as an elevator plate 44 mounted to the frame of the endless conveyer belt means 18 for selected movement between a carton release position below the top flight of the conveyer straps 40, shown in the figures, and a carton stop position above the top flight of the conveyer straps 40.

The elevator plate 44 is preferably about as long as a carton and narrow enough to fit between the two conveyer straps 40 in the lanes 32 of the endless conveyer means 18. Each elevator plate 44 is mounted to the conveyer frame for generally pivotal movement by means of a depending bracket 46 which is connected at one of its ends to the elevator plate 44 and connected at its other end to an elongated rocker arm 48 which extends at about 90° to the depending bracket 46. The rocker arm 48 has a pivotal mounting 50 to the conveyer frame. Friction stop means 52, illustrated as a plate, is located above the top flight of the endless conveyer straps 40 over the elevator plate 44 by a distance somewhat greater then the thickness of a carton 12 so that when the elevator plate 44 is in the carton release position, a carton 12 will pass beneath the stop plate 52. When the elevator plate 44 is operated to the carton stop position, it lifts a carton from the top flight of the endless conveyer straps 40 and into friction contact with the stop plate 52. The stop plate 52 can be coated with a material having a relatively high coefficient of friction, such as rubber, to further assure frictional contact between the stop plate 52 and the carton 12.

With continued reference to FIG. 1, a second stop station, generally denoted as the numeral 54, is operatively associated with each one of the lanes 32 of the endless conveyer belt means 18 downstream of the first stop station 42 to selectively release and stop a carton 12 moving on the endless conveyer straps 40 in each lane 32 from the first stop station 42. As can be seen in FIGS. 1 and 5, the second stop station is illustrated as an upwardly projecting finger mounted to the frame of the endless conveyer belt means 18 for selected movement between a carton release position below the top flight of the conveyer straps 40 and a carton stop position above the top flight of the conveyer straps 40, shown in the figures. The carton stop finger 56 is narrow enough to fit between the two conveyer straps 40 in the lanes 32 of the endless conveyer means 18. Each stop finger 56 is mounted to the conveyer frame for generally pivotal movement by means of an elongated rocker arm 58 which is connected at one end to the lower most end of the stop finger 58 and extends at about 90° to the stop finger 56. The rocker arm 58 has a pivotal mounting 50 to the conveyer frame coincidental with the pivotal mounting 50 of the rocker arm 48. When the stop finger 56 is operated to the carton stop position, the stop finger 56 abuts or engages the leading end of a carton 12 moving on the top flight of the conveyer straps 40.

The first stop station 42 and second stop station 54 are operated in sequence such that when the elevator plate 44 of the first stop station is operated to a carton release position, the stop finger 56 of the second stop station is simultaneously operated to a carton stop position. Likewise, when the elevator plate 44 of the first stop station is operated to a carton stop position, the stop finger 56 of the second stop station is simultaneously operated to a carton release position. To this end, the elevator plate 44 and stop finger 56 are both operatively associated with cam means 60. The cam means 60 includes a rotatably driven continuously rotating cam 62 mounted to the conveyer frame by appropriate journals, and a cam follower 64 attached at one of its ends to both the rocker arm 48 of the elevator plate 44 and the rocker arm 58 of the stop finger 56. As the cam 62 rotates, the cam follower 64 periodically and sequentially causes the first and second stop stations to move between their respective carton release and carton stop positions. Further, the cam 62 is rotatably driven by the same power source which drives the take-away conveyer device 16 through appropriate drive belt and take-off belt routing so that the cam is rotated in timed relationship to the linear speed of the take-away conveyer device 16.

Figure 6:
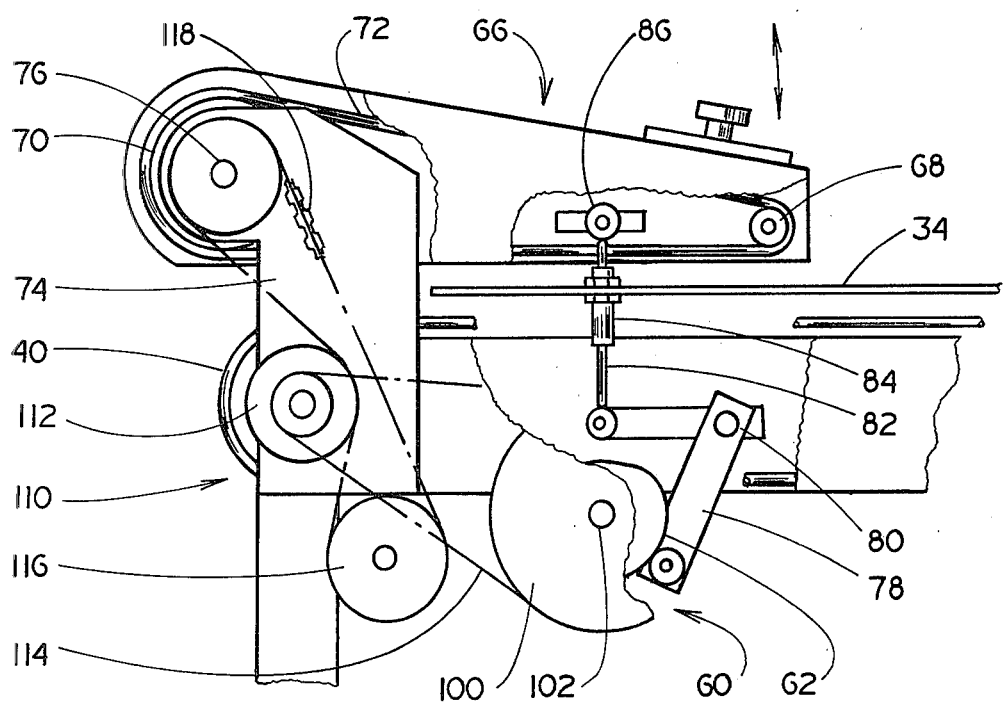
FIG. 6 is an enlarged view of another portion of FIG. 1.

With reference to FIGS. 1 and 6, carton accelerator means, generally denoted as the numeral 66, is located near the second carton stop station 54 to impart a linear acceleration to a carton at the second stop station when the second stop station releases a carton to move the carton rapidly away from the second stop station and onto the take-away conveyer device 16. The carton accelerator means is illustrated as an endless belt device disposed above the top flight of the endless conveyer straps 40 proximate the stop finger 56 of the second stop station 54 for selective movement toward and away from second stop station. The carton accelerator includes a tail pulley 68 and a head pulley 70 with an endless belt 72 trained about the pulleys. The head pulley 70 is driven to move the belt 72 in the same linear direction as the endless conveyer straps 40. The endless conveyer belt device 66 is mounted to the conveyer frame by means of, for example, a bracket 74 attached at one end to the conveyer frame and at the other end to the endless belt device 66. The connection of the bracket 74 to the endless belt device 66 is a journaled connection 76 coaxial with the axis of rotation the head pulley 70 of the endless belt device 66. The endless belt device pivots about the journaled connection 76 generally toward and away from the second stop station 54. The endless belt device 66 is caused to move in concert with the movement of the stop finger 56 such that when the stop finger 56 operates to a carton release position, the endless belt device 66 pivots toward the second stop station 54 a sufficient distance so that the moving endless belt 72 comes into frictional contact with a carton at the second stop station, without exerting a sufficient force on the carton to distort it, imparting an acceleration to the carton due to the fact that the belt 72 has a greater linear velocity than the endless conveyer straps 40, causing the carton to rapidly move away from the second stop station and onto the take-away conveyer device 16 between the lugs 24. The endless conveyer device 66 is caused to pivotally move in timed relationship with the movement of the stop finger 56 by means of the cam means 60. The endless belt device 66 includes a V-shaped cam follower 78 mounted for pivotal movement at its apex 80 to the conveyer frame. One end of the cam follower 78 is in contact with the cam 62 and the other end of the cam follower is in contact with one end of a push rod 82. The push rod 82 is mounted in a bushing 84 attached to a lane divider 34 for longitudinal movement. The other end of the push rod 82 abuts a bearing 86 attached to the endless belt device 66. As the cam 62 rotates, it causes the push rod 82 to move toward and away from the endless belt device 66 through the action of the cam follower 78 against the bearing 86, thus, causing the endless belt device 66 to move about the journaled connection 76 and pivot toward and away from the second stop station 54.

Figure 2:
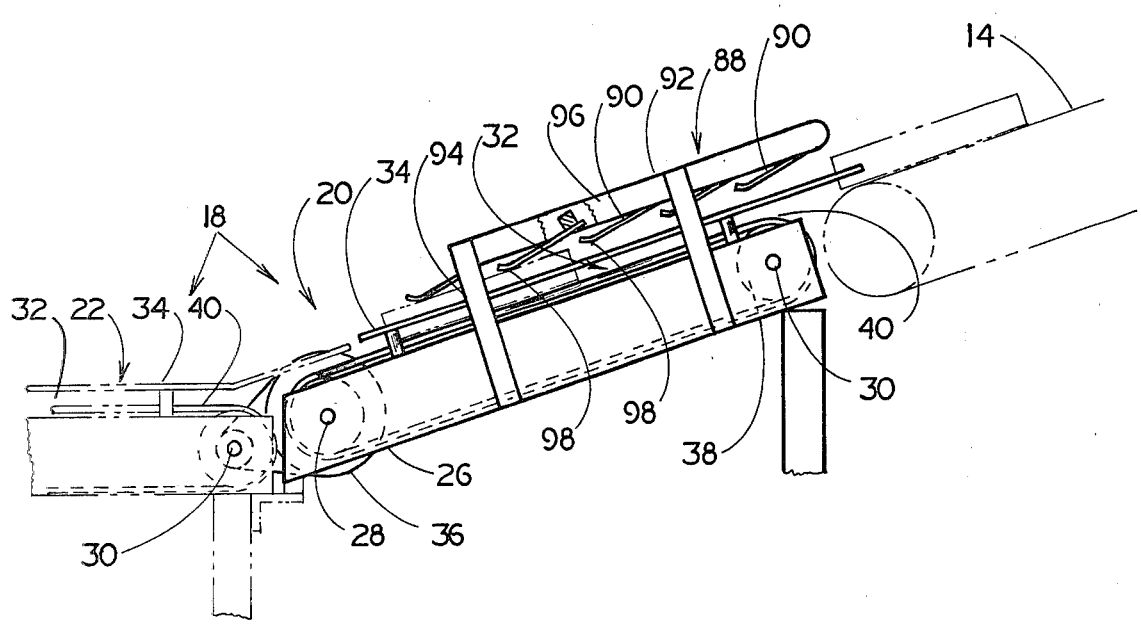
FIG. 2 is a side view of a portion of the apparatus which joins the portion shown in FIG. 1.

Now with reference to FIG. 2, the carton collating and transfer device 10 also includes carton metering means, generally denoted as the number 88, located upstream from the first stop station 42 for spacing out successive cartons before the cartons reach the first stop station. The carton metering means 88 includes at least one carton interference means, such as flexible fingers 90, disposed above the endless conveyer straps 40 in the path of the cartons moving on the endless conveyer straps 40 to contact a carton 12 passing beneath the interference means and applies downward force to the carton. As illustrated, the forcing means comprises a series of flexible fingers 90 spaced apart from one another along the path of a carton moving on the endless conveyer straps 40. A framework 92, having vertical support members 94 and horizontal support members 96 attached thereto, holds the fingers 90 above the endless conveyer straps 40. One end of each finger 90 is attached to the horizontal support member 96 with the free end 98 of the finger 90 being spaced above the endless conveyer straps 40 by a distance less than the thickness of a carton. The cartons are thus held in contact with the friction surface of the endless conveyer straps 40 and consequently move with the same linear velocity as the endless conveyor straps 40. The straps 40 of the metering means 20 are driven at a slower linear velocity than the straps 40 of the first conveyor 22. This velocity difference causes a space to be introduced when the carton accelerates away from metering means 20 on the first conveyor 22.

In operation, cartons move from, for example, carton making machines, along four continuously running carton feeder conveyer devices or belt conveyers 14. These cartons from time-to-time, may be spaced at randomly spaced apart intervals, in tight end-to-end abutment, or in a combination of randomly spaced intervals and tight end-to-end abutment. For efficient packing of these cartons into containers, they should be supplied to the packaging station at uniform intervals. In addition, because usually the packaging operation can be performed at a faster rate than the carton making machines can operate the cartons moving on the carton feeder, conveyer devices 14 are to be channeled into one lane on, for example, the carton take-away conveyer device 16 for supply to the carton packing station. To accomplish this, the cartons move from the carton feeder conveyer devices 14 onto the endless conveyer belt means 18. The cartons move from each of the four carton feeder conveyer devices 14 into a different one of the lanes 32 of the first section 20 of the endless conveyer belt means 18 which is in line with the carton feeder conveyer devices 14. The cartons in each of the lanes 32 continue to be carried by the endless conveyer straps 40 of the endless conveyer belt means 18 until they come into contact with the free end 98 of the most upstream flexible finger 90 of the carton metering means 88. Upon contact, the lead carton is forced into contact with the straps 40 and advances without slippage at the linear velocity of the straps 40, irregardless of pressure from additional cartons which may have been accumulated on feed conveyor 14. When the cartons traverse and finally exit the metering means 88, they are conveyed away on the straps 40 of the first conveyor 20. Since the first conveyor 20 is operating at a greater linear velocity than the metering means 88, an interval is establsihed between succeeding cartons traveling in lane 32. The cartons proceed to the second section 22 of the endless conveyer belt means 18 in each of the four lanes 32 toward the first and second stop stations 42 and 54. For the sake of the following discussion, it is assumed that the elevator plate 44 of the first stop station 42 is in the carton release position and, therefore, the stop finger 56 of the second stop station 54 is in the carton stop position. The lead carton moves past the first stop station 42 to the second stop station 54 where it comes into abutment with the stop finger 56 until the space between adjacent lugs 24 of the take-away conveyer device 16 are in position at the end of the second section 22 of the endless conveyor belt means 18 to receive a carton therebetween. At this time, the stop finger 56 of the second stop station 54 moves to a carton release position out of abutment with a carton, the carton accelerator means 66 moves down toward the carton at the second stop station 54 until the belt 72 of the accelerator means 66 contacts the carton and rapidly moves the carton from the second stop station 54 and onto the take-away conveyer device 18 in the space between adjacent lugs 24, and the elevator plate 44 of the first stop station moves to the carton stop position raising a following carton off the endless conveyer straps 40 and into frictional contact with the stop plate 52. As take-away conveyer device 16 continues to move bringing other spaced lugs 24 toward a position at the end of the second section 22 of the endless conveyer means 18, the elevator plate 44 of the first stop station 42 moves to a carton release position placing a carton back onto the endless conveyer straps 40 so that the carton moves toward the second stop station 54. Simultaneously, the stop finger 56 of the second stop station 54 moves to the carton stop position and the accelerator means 66 moves upwardly away from the second stop station 54 to allow a carton to move beneath it to the stop finger 56. The take-away conveyer device 16 continuing to move, brings an empty space between adjacent lugs 24 into aligned position with the lanes at the end of the second section of the endless conveyer belt means as the stop finger 56 of the second stop station 54 moves to the carton release position and the above-discussed sequence of events is repeated.

The first stop station 42, second stop station 54, and accelerator means 66 are all actuated together to move in concert by the same cam 62.

With reference to FIG. 1, the cam 62 is rotatably driven through a pulley 100 concentrically disposed with the cam 62 and attached to a common shaft 102 to which the cam 62 is also attached for rotation therewith. The pulley 100 is driven by means of a driven belt 104 which is driven from the head shaft 28 of the second section 22 of the endless conveyer belt means 18. As is common practice, the head shaft is the driven shaft of the endless belt conveyer means 18 and is in turn driven by a belt 106 driven by a motor 108.

With reference to FIG. 6, the endless belt 72 of the accelerator means 66 is driven by the head pulley 70 by means of a belt drive system, generally denoted as the number 110. This belt drive system includes a driven pulley 112 which is rotatably driven from the pulley 100 concentric with the cam 62 through a belt 114, and an idler pulley 116 near the driven pulley 112 which is drivingly connected to the head pulley 70 of the accelerator means 66 by means of a belt 118. The belt 118 is in driving contact at its outside surface with the driven pulley 112. Thus, the endless belt 72 of the accelerator means is driven in the same linear direction as the endless conveyer straps 40 of the endless conveyer belt means 18 from the head shaft 28 of the endless conveyer belt means 18. The various pulleys can be sized so that the endless belt 72 of the accelerator means 66 has the same or higher linear speed than do the endless conveyer straps 40.

The foregoing detailed description is given primarily for clarity of understanding and no unneccessary limitations should be understood therefrom, for modifications will be obvious to one skilled in the art upon reading this disclosure and may be made without departing from the spirit of the invention or scope of the claims.

What is claimed is:

1. A carton collating and transfer apparatus for distributing cartons received from a plurality of continuously running feeder conveyer devices onto a single take-away conveyer device moving at an angle to the feeder conveyer devices, comprising:
endless conveyer belt means defining plural paths equal in number to the number of feeder conveyer devices, each path of said conveyer belt means being associated at one end with a different one of the feeder conveyer devices to receive cartons therefrom and associated at the other end with said take-away conveyer device for discharging cartons thereon;
a first carton stop station associated with each one of said plural paths of said conveyer belt means movable between a carton release position and a carton stop position for selectively stopping a carton moving in each path of said conveyer belt means, said first stop station further comprising an elevator plate mounted for movement between a carton release position below the top flight of said endless conveyer belt means and a carton stop position above the top flight of said endless conveyer belt means to lift cartons off said top flight; and, stop plate means spaced above the top flight of said endless conveyer belt means over said elevator plate such that when said elevator stop plate moves to a carton stop position it lifts a carton off the top flight and into friction contact with said stop plate;
a second carton stop station associated with each one of said plural paths of said conveyer belt means disposed downstream from said first stop station and movable between a carton release position and a carton stop position for selectively stopping a carton moving in said path of said conveyer belt means, said second stop station being operated in sequence with said first stop station to a carton release position when said first stop station is in a carton stop position, and to a carton stop position when said first stop station is in a carton release position; and,
carton accelerator means proximate each of said second carton stop stations to impart linear acceleration to a carton at said second stop station when said second stop station is in a carton release position to move the carton rapidly away from said second stop station and onto the take-away conveyer device located downstream of said second stop station.

2. The carton collating and transfer apparatus of claim 1, wherein said second stop station comprises:
a stop finger mounted for movement between a carton release position below the top flight of said endless belt means and a carton stop position above the top flight of said endless conveyer belt means to engage a leading end of a carton moving on the top flight of said endless conveyer belt means.

3. A carton collating and transfer apparatus for distributing cartons received from a plurality of continuously running feeder conveyer devices onto a single take-away conveyer device moving at an angle to the feeder conveyer devices, comprising:
endless conveyer belt means defining plural paths equal in number to the number of feeder conveyer devices, each path of said conveyer belt means being associated at one end with a different one of the feeder conveyer devices to receive cartons therefrom and associated at the other end with said take-away conveyer device for discharging cartons thereon;
a first carton stop station associated with each one of said plural paths of said conveyer belt means movable between a carton release position and a carton stop position for selectively stopping a carton moving in each path of said conveyer belt means;
a second carton stop station associated with each one of said plural paths of said conveyer belt means disposed downstream from said first stop station and movable between a carton release position and a carton stop position for selectively stopping a carton moving in said path of said conveyer belt means, said second stop station being operated in sequence with said first stop station to a carton release position when said first stop station is in a carton stop position, and to a carton stop position when said first stop station is in a carton release position; and,
carton accelerator means proximate each of said second carton stop stations to impart linear acceleration to a carton at said second stop station when said second stop station is in a carton release position to move the carton rapidly away from said second stop station and onto the take-away conveyer device located downstream of said second stop station, said carton accelerator means being disposed above said second stop station and mounted for movement generally downwardly toward the top flight of said endless conveyer belt means to a carton contacting position simultaneously with the movement of said second stop station toward a carton release position and for movement generally away from the top flight of said endless belt conveyer means simultaneously with the movement of said second stop means toward a carton stop position.

4. The carton collating and transfer apparatus of claim 3, wherein said carton accelerator means comprises:
an endless belt device disposed above the top flight of said endless conveyer belt means proximate said second stop station and moving in the same linear direction as said endless conveyer belt means, said endless conveyer belt device being mounted for selective movement generally downwardly toward the top flight of said endless conveyer belt means a sufficient distance so that the endless belt thereof will be in frictional contact with a carton at said second stop station without exerting a sufficient force on the carton to distort the carton.

5. The carton collating and transfer apparatus of claim 4, wherein said endless belt device moves at a faster linear speed than said endless conveyer belt device.

6. A carton collating and transfer apparatus for distributing cartons received from a plurality of continuously running feeder conveyer devices onto a single take-away conveyer device moving at an angle to the feeder conveyer devices, comprising:
endless conveyer belt means defining plural paths equal in number to the number of feeder conveyer devices, each path of said conveyer belt means being associated at one end with a different one of the feeder conveyer devices to receive cartons therefrom and associated at the other end with said take-away conveyer device for discharging cartons thereon;
a first carton stop station associated with each one of said plural paths of said conveyer belt means movable between a carton release position and a carton stop position for selectively stopping a carton moving in each path of said conveyer belt means;
a second carton stop station associated with each one of said plural paths of said conveyer belt means disposed downstream from said first stop station and movable between a carton release position and a carton stop position for selectively stopping a carton moving in said path of said conveyer belt means, said second stop station being operated in sequence with said first stop station to a carton release position when said first stop station is in a carton stop position, and to a carton stop position when said first stop station is in a carton release position;
carton accelerator means proximate each of said second carton stop stations to impart linear acceleration to a carton at said second stop station when said second stop station is in a carton release position to move the carton rapidly away from said second stop station and onto the take-away conveyer device located downstream of said second stop station; and,
carton metering means in each path of said endless conveyer belt means disposed upstream of said first stop station for uniformly spacing out successive cartons moving on said endless conveyer belt means before the cartons reach said first stop station, said metering means comprising carton forcing means disposed above said endless conveyer belt means for forcing cartons to move with the endless conveyer belt until such time as they are discharged onto an endless conveyer belt operating at greater linear velocity to cause a uniform spacing between successive cartons.

7. The carton collating and transfer apparatus of claim 6, wherein said carton forcing means comprises at least one flexible finger mounted above said endless conveyer belt means with the free end of said finger being spaced above the top flight of said endless conveyer belt means a distance less than the thickness of a carton such that the movement of a carton on said endless conveyer belt means is at the same linear velocity as said endless conveyor belt until such time as they are discharged onto an endless conveyor belt moving in the same direction but with greater linear velocity to cause a uniform spacing between successive cartons.

8. The carton collating and transfer apparatus of claim 7, comprising a plurality of said flexible fingers spaced apart along the endless conveyer belt means to successively maintain the movement of successive cartons moving on said endless conveyer belt means at the same linear velocity as said endless conveyor.

9. A carton collating and transfer apparatus for distributing cartons received from a plurality of continuously running feeder conveyer devices onto a single take-away conveyer device moving at an angle to the feeder conveyer devices, comprising:
endless conveyer belt means defining plural paths equal in number to the number of feeder conveyer devices, each path of said conveyer belt means being associated at one end with a different one of the feeder conveyer devices to receive cartons therefrom and associated at the other end with said take-away conveyer device for discharging cartons thereon;
a first carton stop station associated with each one of said plural paths of said conveyer belt means movable between a carton release position and a carton stop position for selectively stopping a carton moving in each path of said conveyer belt means, said first stop station comprising an elevator plate mounted for movement between a carton release position below the top flight of said endless conveyer belt means and a carton stop position above the top flight of said endless conveyer belt means to lift a carton off the top flight of said endless conveyer belt means;
a second carton stop station associated with each one of said plural paths of said conveyer belt means disposed downstream from said first stop station and movable between a carton release position and a carton stop position for selectively stopping a carton moving in said path of said conveyer belt means, said second stop station being operated in sequence with said first stop station to a carton release position when said first stop station is in a carton stop position, and to a carton stop position when said first stop station is in a carton release position, said second stop station comprising a stop finger mounted for movement between a carton release position below the top flight of said endless conveyer belt means and a carton stop position above the top flight of said endless conveyer belt means to engage a leading end of a carton moving on the top flight of said endless conveyer belt means;
cam means operatively associated with said elevator plate and said stop finger for simultaneously moving said elevator plate to a carton stop position and said stop finger to a carton release position, and for simultaneously moving said elevator plate to a carton release position and said stop finger to a carton stop position; and, carton accelerator means proximate each of said second carton stop stations to impart linear acceleration to a carton at said second stop station when said second stop station is in a carton release position to move the carton rapidly away from said second stop station and onto the take-away conveyer device located downstream of said second stop station.

10. The carton collating and transfer apparatus of claim 9, wherein:

said accelerator means is disposed above said second stop station and mounted for movement generally downwardly toward the top flight of said endless conveyer belt means to a carton contacting position; and, said cam means is operatively associated with said accelerator means for simultaneously moving said accelerator means to a carton contacting position and said stop finger to a carton release position.

11. The carton collating and transfer apparatus of claim 9, wherein said cam means comprises:

a rotatably driven continuously rotating cam; and, a cam follower operatively associated with both said elevator plate of said first stop station and said stop finger of said second stop station so that said elevator plate and said stop finger move simultaneously with the movement of said cam follower.

* * * * *